(12) United States Patent
Vasudevan et al.

(10) Patent No.: US 9,147,000 B2
(45) Date of Patent: Sep. 29, 2015

(54) METHOD AND SYSTEM FOR RECOMMENDING WEBSITES

(75) Inventors: Sudharsan Vasudevan, Sunnyvale, CA (US); Eugene Kouichi Kashida, Albany, CA (US); Ethan Batraski, Foster City, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 13/537,423

(22) Filed: Jun. 29, 2012

(65) Prior Publication Data
US 2014/0006399 A1 Jan. 2, 2014

(51) Int. Cl.
G06F 17/30 (2006.01)

(52) U.S. Cl.
CPC .... *G06F 17/30867* (2013.01); *G06F 17/30598* (2013.01); *G06F 17/30601* (2013.01); *G06F 17/30705* (2013.01); *G06F 17/30713* (2013.01)

(58) Field of Classification Search
None
See application file for complete search history.

(56) References Cited

U.S. PATENT DOCUMENTS

| | | | |
|---|---|---|---|
| 6,567,104 B1 * | 5/2003 | Andrew et al. | 715/762 |
| 2006/0293065 A1 * | 12/2006 | Chew et al. | 455/456.3 |
| 2007/0005389 A1 * | 1/2007 | Apparao et al. | 705/1 |
| 2008/0126176 A1 * | 5/2008 | Iguchi | 705/10 |
| 2008/0134042 A1 * | 6/2008 | Jankovich | 715/733 |
| 2009/0210806 A1 * | 8/2009 | Dodson et al. | 715/760 |
| 2010/0082670 A1 * | 4/2010 | Chan et al. | 707/770 |
| 2010/0095219 A1 * | 4/2010 | Stachowiak et al. | 715/745 |
| 2010/0205542 A1 * | 8/2010 | Walman | 715/753 |
| 2010/0211304 A1 * | 8/2010 | Hwang et al. | 701/200 |
| 2010/0251305 A1 * | 9/2010 | Kimble et al. | 725/46 |
| 2011/0029510 A1 * | 2/2011 | Kroon et al. | 707/723 |
| 2011/0126145 A1 * | 5/2011 | Rhee et al. | 715/772 |
| 2011/0208732 A1 * | 8/2011 | Melton et al. | 707/728 |
| 2011/0225192 A1 * | 9/2011 | Imig et al. | 707/775 |
| 2012/0059707 A1 * | 3/2012 | Goenka et al. | 705/14.41 |
| 2012/0158693 A1 * | 6/2012 | Papadimitriou et al. | 707/708 |
| 2012/0290575 A1 * | 11/2012 | Hu et al. | 707/737 |
| 2013/0246522 A1 * | 9/2013 | Bilinski et al. | 709/204 |

* cited by examiner

*Primary Examiner* — Richard Bowen
(74) *Attorney, Agent, or Firm* — Pillsbury Winthrop Shaw Pittman LLP

(57) ABSTRACT

Method, apparatus, and programs for recommending websites. Information related to a user's browsing history of a plurality of websites is obtained. A browsing co-occurrence of at least some of the plurality of websites in one or more time periods is determined based on the obtained information related to the user's browsing history. The plurality of websites are assigned to a plurality of website groups based on the determined browsing co-occurrence. Each of the plurality of website groups is associated with one of the one or more time periods. At least one of the plurality of website groups is presented to the user based on their associated time periods.

19 Claims, 12 Drawing Sheets

METHOD AND SYSTEM FOR RECOMMENDING WEBSITES

BACKGROUND

1. Technical Field

The present teaching relates to methods, systems, and programming for Internet services. Particularly, the present teaching is directed to methods, systems, and programming for recommending websites to a user.

2. Discussion of Technical Background

Most major web browsers implement the function of websites recommendation or navigation recommendation, which automatically provides a list of websites that a user of the web browser is most likely to visit before the user enters the website address. For example, GOOGLE CHROME's default page shows the most-visited-sites every time when the user opens the browser or a new tab of the browser. In addition to the default page, some web browsers, such as CHROME and FIREFOX, automatically show the most-visited-sites in their address bars when the user starts to type in the address bar. The recommendation is made based on visit frequency, visit recency, and website bookmarks saved by the user.

However, when making the recommendation, the known solutions consider each website individually and do not take their temporal relationship into consideration. For example, none of the known solutions aggregates different websites that were frequently visited in the similar time spans when making the recommendation. In other words, the known solutions do not perform temporal studies of user activities or multiple website suggestions for quick navigation. Moreover, users have to manually bookmark and open up the recommended frequently visited websites one by one even after the known solutions have made the recommendation.

Therefore, there is a need to provide an improved solution for recommending websites to a user to solve the above-mentioned problems.

SUMMARY

The present teaching relates to methods, systems, and programming for Internet services. Particularly, the present teaching is directed to methods, systems, and programming for recommending websites to a user.

In one example, a method for recommending websites is provided. Information related to a user's browsing history of a plurality of websites is obtained. A browsing co-occurrence of at least some of the plurality of websites in one or more time periods is determined based on the obtained information related to the user's browsing history. The plurality of websites are assigned to a plurality of website groups based on the determined browsing co-occurrence. Each of the plurality of website groups is associated with one of the one or more time periods. At least one of the plurality of website groups is presented to the user based on their associated time periods.

In another example, a system for recommending websites is provided. The system includes a browsing history fetcher, a browsing co-occurrence calculator, a grouping unit, and a recommendation module. The browsing history fetcher is configured to obtain information related to a user's browsing history of a plurality of websites. The browsing co-occurrence calculator is configured to determine a browsing co-occurrence of at least some of the plurality of websites in one or more time periods based on the obtained information related to the user's browsing history. The grouping unit is configured to assign the plurality of websites to a plurality of website groups based on the determined browsing co-occurrence. Each of the plurality of website groups is associated with one of the one or more time periods. The recommendation module is configured to present at least one of the plurality of website groups to the user based on their associated time periods.

Other concepts relate to software for recommending websites. A software product, in accordance with this concept, includes at least one machine-readable non-transitory medium and information carried by the medium. The information carried by the medium may be executable program code data regarding parameters in association with a request or operational parameters, such as information related to a user, a request, or a social group, etc.

In still another example, a machine readable and non-transitory medium having information recorded thereon for recommending websites, wherein the information, when read by the machine, causes the machine to perform a series of steps. Information related to a user's browsing history of a plurality of websites is obtained. A browsing co-occurrence of at least some of the plurality of websites in one or more time periods is determined based on the obtained information related to the user's browsing history. The plurality of websites are assigned to a plurality of website groups based on the determined browsing co-occurrence. Each of the plurality of website groups is associated with one of the one or more time periods. At least one of the plurality of website groups is presented to the user based on their associated time periods.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficient and effective website recommendation made on a user device. The method and system as disclosed herein aim at improving the end-users' experience by assisting them to quickly navigate to their frequently visited websites with very little effort. The method and system perform temporal studies on the users' browsing history and identify user routines based on the visiting co-occurrence of websites over similar time spans. The user routines are used for automatically suggesting websites to the user based on the current time. Moreover, the user routines may be collected from different users and provided to the search engine to improve search algorithms based on temporal events.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

Figure 1:
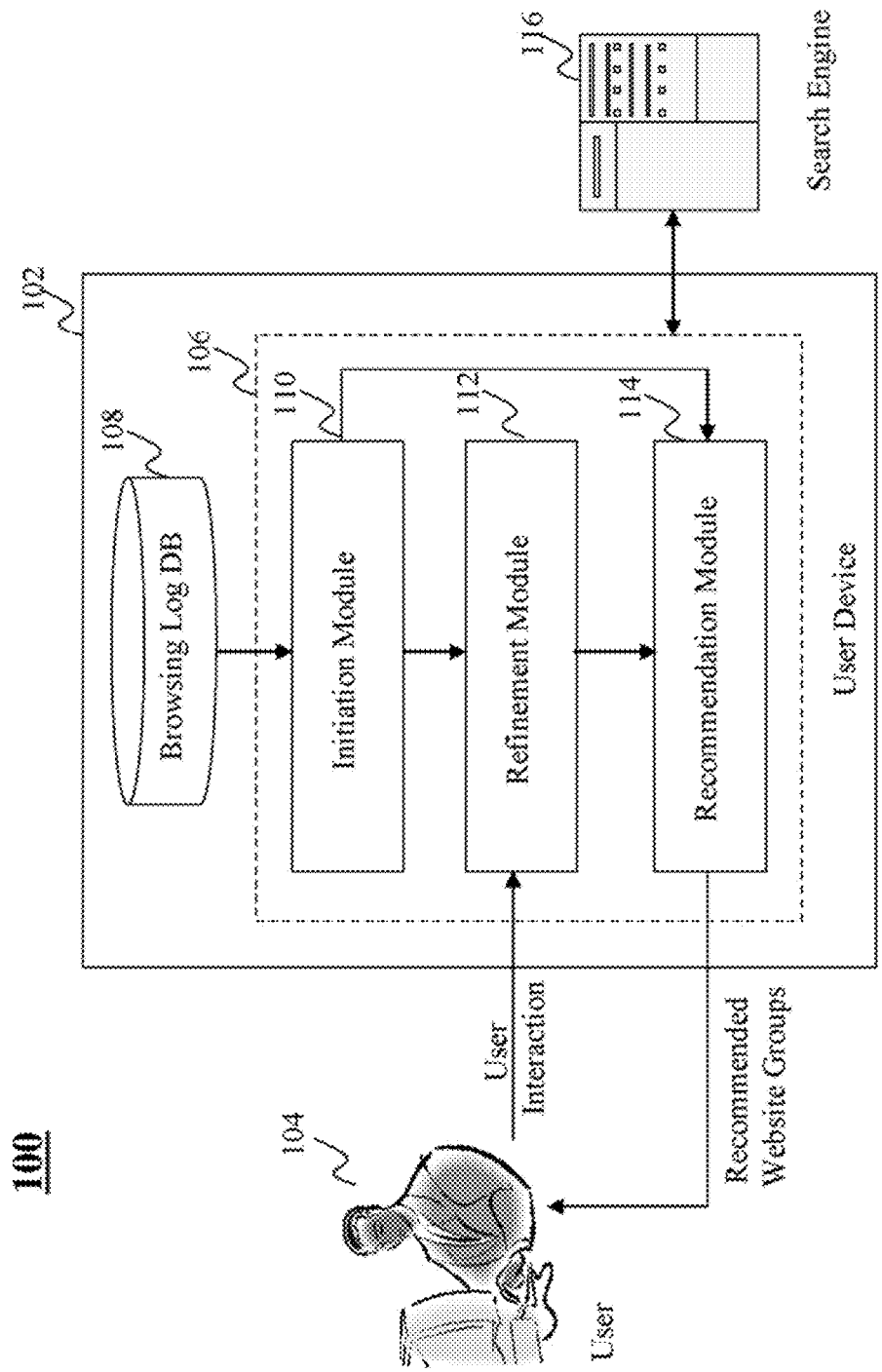
FIG. 1 is a high level exemplary system diagram of a system for recommending websites, according to an embodiment of the present teaching.

FIG. 1 is a high level exemplary system diagram of a system for recommending websites, according to an embodiment of the present teaching. The system 100 in this example includes a user device 102 utilized by a user 104 for browsing websites. The user device 102 may be a laptop computer, desktop computer, netbook computer, media center, mobile device, gaming console, set-top box, printer, or any other suitable device. In this example, the user device 102 includes a mobile device (handheld device or portable device), such as but not limited to, a smart phone, a tablet, a music player, a handheld gaming console, and a global positioning system (GPS) receiver. The user device 102 may have a browsing application 106 and a browsing log database 108 residing thereon. The browsing application 106 may be any suitable applications pre-installed on the user device 102, such as a web browser, or any third-part applications installed by the user 104, such as a social network client application. The browsing log database 108 may be any suitable database that records browsing history of the user 104. Although the browsing log database 108 in this example is shown as a part separate from the browsing application 106, it may be part of the browsing application 106 in other examples.

The browsing application 106 in this example includes an initiation module 110, a refinement module 112, and a recommendation module 114. Those modules may be implemented as part of the browsing application 106 or as part of any plug-in or add-on, which is integrated with the browsing application 106 and has access to constant stream of information from the browsing log database 108. In this example, the initiation module 110 is responsible for building initial website groups (seed information) based on visiting co-occurrences of websites obtained from the user browsing history in the browsing log database 108. Each website group may be associated with a particular time period, such as but not limited to, morning, noon, night, weekday, and weekend. Each website group may be considered as a "time-boxed session activity" (TSA), which is a set of visited websites co-occurring in the user's browsing behavior (user routine) over similar time spans.

The refinement module 112 in this example is responsible for continuously and dynamically refining the initial website groups based on user interaction with the recommended website groups. Information related to the user interaction includes, but is not limited to, implicit changes of the user's browsing behavior, explicit user interactions with the recommended website groups, user actions other than browsing behavior, e.g., creation of folder, bookmarks, etc., and inactivity with respect to the recommended website groups. Based on the user interaction, the refinement module 112 may modify an existing website group by adding a new website and/or removing an existing website and may also create a new website group, remove an existing website group, or merge two or more existing website groups.

The recommendation module 114 in this example is configured to present at least one website group to the user 104 based on their associated time periods. In one example, if the current time falls into a time period associated with only one website group, the recommendation module 114 may present the websites assigned to the website group by automatically opening up all the websites in the browsing application 106 for the user 104. In another example, if the time period is associated with two or more website groups, or if the current time is close to two time periods associated with two or more website groups, all those website groups may be presented by the recommendation module 114 to the user to select. Based on user selection, the websites assigned to the selected website group may be automatically opened up in the browsing application 106 for the user 104. For example, if the user 104 launches the browsing application 106 at 11:30 AM, two website groups associated with "noon" and "morning," respectively, may be recommended to the user 104 to choose.

The website groups (TSAs) may be collected across multiple users and fed into a search engine 116 to calculate websites with similar intent and also show time-based search results. In one example, suggestions of search results based on time and previous browsing history for a query may be optimized based on the collected website groups. For example, in the night time, the query "johnny depp movies" may point to his page on imdb.com, while during the weekend, it may point to his NETFLIX page. In another example, the website groups may help the search engine 116 to categorize a new website based on their visiting co-occurrence. For example, if pinterest.com is followed by twitter.com or facebook.com in the website groups, then the search engine 116 may understand that pinterest.com is related to social networking. In still another example, websites in the same website group may be considered by the search engine 116 as similar websites when providing search results. For example, if results are shown from imdb.com for query "family guy," then pages from hulu.com may also be shown as results. In yet another example, query disambiguation may be improved. For example, if "pepsi" is searched in a website group associated with "noon," it may be about stocks/finance of the PEPSI Company. If it is searched in a website group associated with "weekend," then it may be about buying a PEPSI drink for a movie.

Figure 2:
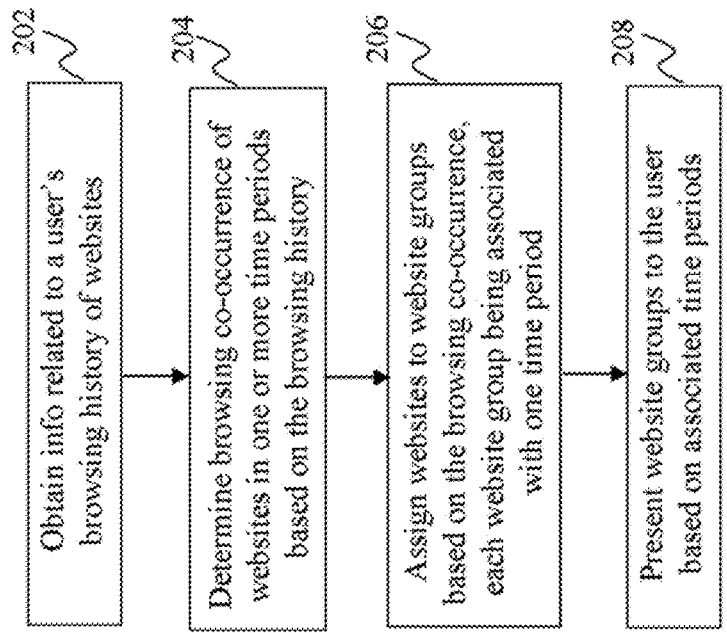
FIG. 2 is a flowchart of an exemplary process for recommending websites, according to an embodiment of the present teaching.

FIG. 2 is a flowchart of an exemplary process in which websites recommendation is performed, according to an embodiment of the present teaching. It will be described with reference to the above figures. However, any suitable module or unit may be employed. Beginning at block 202, information related to a user's browsing history of a plurality of websites is obtained. The information includes, for example, a frequency and a recency of visiting each of the plurality of websites. At block 204, processing may continue where a browsing co-occurrence of at least some of the plurality of websites in one or more time periods is determined based on the obtained information related to the user's browsing history. The one or more time periods correspond to, for example, morning, noon, night, weekday, or weekend. Moving to block 206, the plurality of websites are assigned to a plurality of website groups based on the determined browsing co-occurrence. Each of the plurality of website groups is associated with one of the one or more time periods. In other words, co-occurring websites may be grouped by, for example, any suitable clustering algorithm runs on the browsing history. As described above, blocks 202, 204, 206 may be performed by the initiation module 110. At block 208, at least one of the plurality of website groups is presented to the user based on their associated time periods. As described above, this may be performed by the recommendation module 114.

Figure 3:
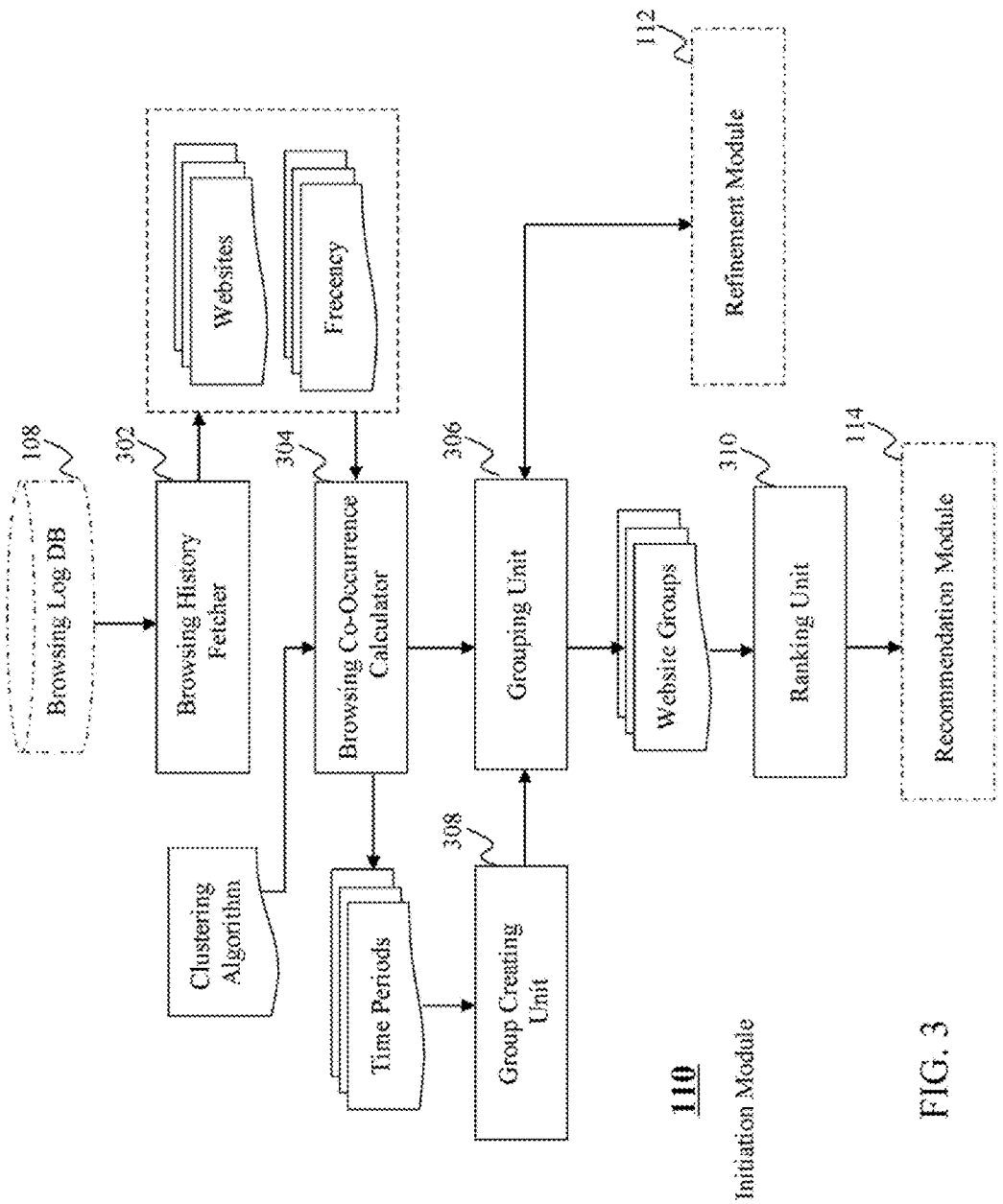
FIG. 3 is an exemplary diagram of an initiation module of the system for recommending websites shown in FIG. 1, according to an embodiment of the present teaching.

FIG. 3 is an exemplary diagram of an initiation module of the system for recommending websites shown in FIG. 1, according to an embodiment of the present teaching. The initiation module 110 in this example includes a browsing history fetcher 320, a browsing co-occurrence calculator 304, a grouping unit 306, a group creating unit 308, and a ranking unit 310. In one example, during the initial install on the user device 102, the initiation module 110 may go through any pre-existing browsing history, if present, and try to calculate "frecency" of each visited website and understand the co-occurrence of different websites in the browsing activities using a clustering algorithm run on the browsing history. "Frecency" is a heuristic measure that combines the frequency and recency of visits to a given URI, used by some web browsers to rank URIs.

The browsing history fetcher 320 in this example is configured to obtain information related to a user's browsing history of a plurality of websites from, for example, the browsing log database 108 on the user device 102. In another example, the information related to the user's browsing history may be also fetched from a remote database. Two types of information are fetched as shown in FIG. 3: the visited websites and the frecency, i.e., frequency and recency, of each visited website. For example, the information may include the number of times each website has been visited and the last visit time.

The browsing co-occurrence calculator 304 in this example is configured to determine a browsing co-occurrence of at least some of the plurality of websites in one or more time periods based on the obtained information related to the user's browsing history. For example, from the fetched information, the browsing co-occurrence calculator 304 may try to understand what set of websites co-occurred based on the time at which they were visited and the number of times they were visited. In one example, if the visit of one website occurs after the visit of another website, then their co-occurrence chance increases. In another example, if the numbers of visiting occurrences of two websites are around the same, then their co-occurrence chance increases. In this example, the browsing co-occurrence calculator 304 is also responsible for determining when those co-occurrences happened and extracting corresponding time periods of the visiting co-occurrences. The time periods correspond to, for example, morning, noon, night, weekday, weekend, etc. For example, the browsing co-occurrence calculator 304 may identify that the visits of social network websites and news websites, such as facebook.com, news.yahoo.com, finance.yahoo.com, etc., co-occurred in the morning, while the visits of media related websites, such as imdb.com, youtube.com, omg.yahoo.com, netflix.com, etc., co-occurred in the evening. The group creating unit 308 is then responsible for creating website groups automatically and name them accordingly. That is, the group creating unit 308 in conjunction with the browsing co-occurrence calculator 304 may go through the fetched information and try to understand if standard patterns such as "morning," "noon," "night," or "weekend" could be obtained from the given information. It is understood that naming is optional, and the user may decide to change the name.

The grouping unit 306 in this example is configured to assign the plurality of websites to a plurality of website groups based on the determined browsing co-occurrence. Each of the plurality of website groups is associated with one of the one or more time periods. In this example, a clustering algorithm may be used, such as the K-means clustering algorithm or any other suitable clustering algorithm that is capable of grouping a bunch of similar entities, to perform the grouping. The grouping may take into consideration the calculated visiting co-occurrence and the frequency with which they were visited as mentioned above. In any event, a plurality of website groups, each being associated with a time period and containing one or more websites, are initially created by the grouping unit 306. It is understood that, in some examples, the user may be allowed to create, delete or modify the initial website groups.

In this example, the ranking unit 310 is configured to, for each of the plurality of website groups, rank the plurality of websites based on their weights. A weight for each website assigned to each website group may be determined by the grouping unit 306 based on the corresponding frequency and recency. In addition to ranking the websites in each website group, the ranking unit 310 may be also responsible for ranking the website groups based on the websites assigned to a website group. For example, the weight of all the websites assigned to each website group may be combined as the weight of the website group. The ranking may be used later by the recommendation module 114 for recommendation. It is understood that the grouping unit 306 in conjunction with the refinement module 112 may be used to refine the initial website groups, which will be described later in detail.

Figure 4:
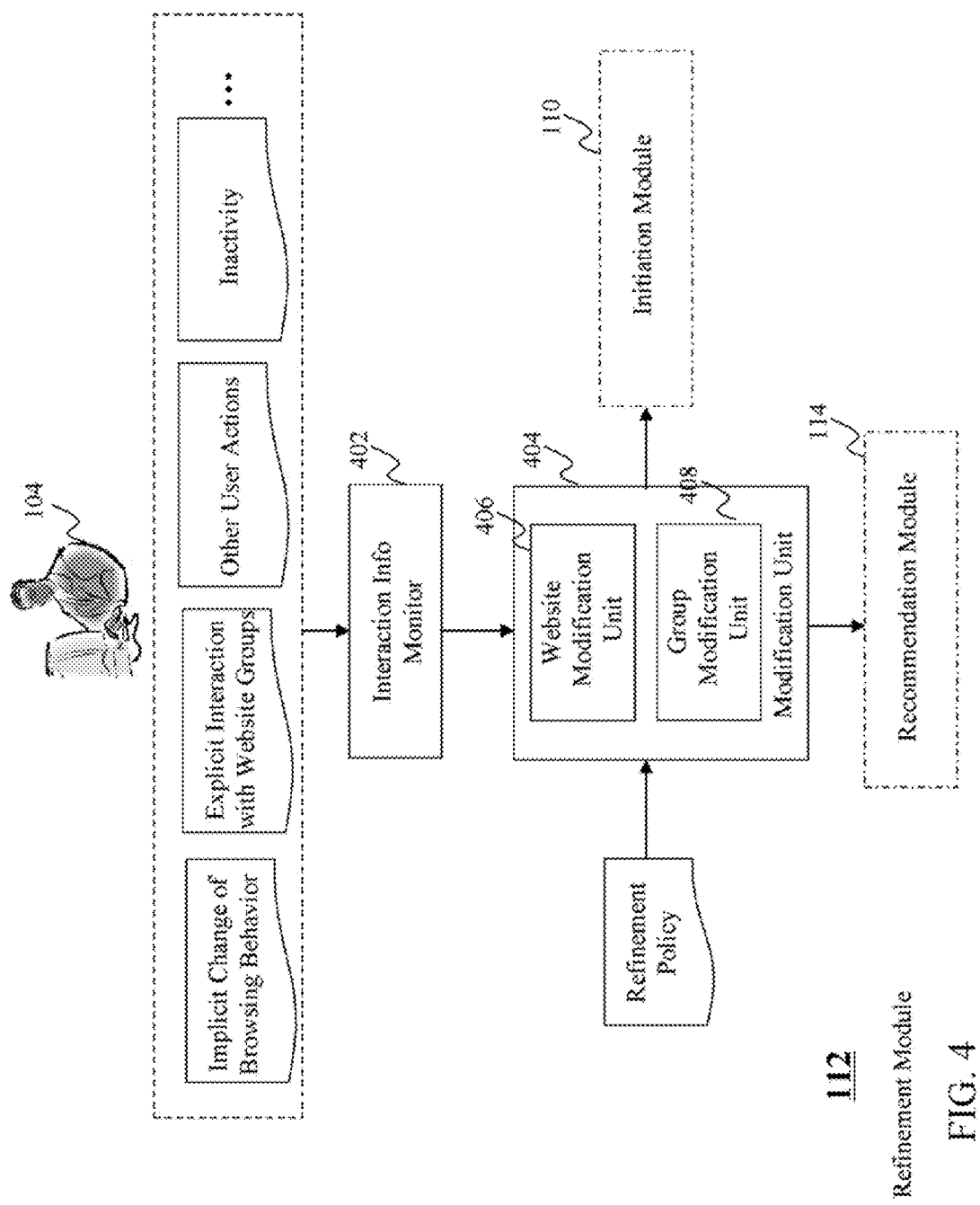
FIG. 4 is an exemplary diagram of a refinement module of the system for recommending websites shown in FIG. 1, according to an embodiment of the present teaching.

FIG. 4 is an exemplary diagram of a refinement module of the system for recommending websites shown in FIG. 1, according to an embodiment of the present teaching. The refinement module 112 in this example includes an interaction information monitor 402 and a modification unit 404 having a website modification unit 406 and a group modification unit 408. The initial website groups created by the initiation module 110 may be refined based on information related to the user's interaction with each website group. The refinement module 112 in this example continuously runs to dynamically collect user information/action and refine the website groups based on the collected information.

The interaction information monitor 402 in this example is configured to collect information related to the user's interaction with each of the plurality of website groups. The collected information includes, but is not limited to, implicit changes of the user's browsing behavior, explicit user interactions with the recommended website groups, user actions other than browsing behavior, e.g., creation of folder, bookmarks, etc., and inactivity with respect to the recommended website groups. The implicit changes of the user's browsing behavior over the time periods may affect the website groups. The implicit changes include, for example, 1) new websites being introduced in the same time period, 2) growth/decay in the visit of websites that are part of an existing website group, and 3) co-occurrence of a parent domain and pages within a domain. The explicit user interactions with the recommended website groups include, for example, 1) voting up or down or deleting a website within a website group, 2) voting up or down or deleting an existing website group, 3) adding a website explicitly to an existing website group, 4) clicking on a subset of websites within a website group, and 5) clicking on the entire website group and opening all websites at once. The user actions other than browsing behavior include, for example, 1) explicitly bookmarking a website which is part of an existing website group, and 2) explicitly bookmarking websites under the same folder as other links that are part of an existing website group. The inactivity with respect to the recommended website groups includes, for example, 1) skip a few websites when opening a website group and 2) complete inactivity of a suggested website group. It is understood that, however, any other user interaction related to the website groups may be collected by the interaction information monitor 402 as well.

The modification unit 404 in this example is configured to modify the plurality of website groups based on the collected information related to the user's interaction. The website modification unit 406 is responsible for modifying the websites within each website group, while the group modification unit 408 is responsible for modifying the entire website group. Predefined refinement policy may be applied to guide the modification.

An existing initial website group may be modified by the modification unit 404 based on the collected information as mentioned above. In one example, a new website may be assigned to an existing website group if it is frequently co-occurring along with other websites in the website group in the same time period. For example, an implicit change of user browsing behavior by visiting a new website in a time period or an explicit interaction with the website group by clicking on the subset of websites within the website group may cause this modification. For example, if the visit of twitter.com is frequently co-occurs with the visits of gmail.com and facebook.com around the same morning time associated with the "morning" website group, then twitter.com may be assigned to the "morning" website group. Similarly, a website in an existing website group may be removed if, for example, there is decay in the visit of the website or the user skips the website while opening the website group.

In another example, a particular website's ranking in a website group may be moved up. For example, an implicit change of user browsing behavior, such as visiting a new website in a time period or growth in the visit of a website, an explicit interaction with the website group, such as voting up a website, adding a website, or clicking on a subset of websites, or explicitly bookmarking a website may all cause this modification. For example, if the user keeps clicking on or votes up netflix.com, the ranking of netflix.com may be moved up to its current position in a "weekend" website group. If the user keeps visiting youtube.com all the times, the ranking of youtube.com may move up based on how frequently the user visits the website in all website groups to which youtube.com is assigned.

In still another example, two co-occurring websites assigned to a website group may be merged, for example, if there is a co-occurrence of a parent domain and pages within a domain. For example, in the "morning" website group, if finance.yahoo.com and finance.com.com?q=YHOO co-occur very frequently, then the parent website (finance.yahoo.com) may be merged into just finance.com.com?q=YHOO. This helps the user to move two steps ahead by predicting the fact that the user uses finance.yahoo.com just as a portal to visit finance.com.com?q=YHOO.

In yet another example, clicking on a website group and opening up all the websites may help the clustering algorithm of the grouping unit 306 to understand which the website group is more important in a given time period. For example, if there are two website groups both associated with the morning time period (e.g., website group A including mail.yahoo.com, gmail.com, facebook.com, finance.yahoo.com, website group B including mail.yahoo.com, gmail.com, facebook.com, news.google.com) with the former being very frequently used rather than the latter, then website group B may be either removed or merged with lower weight into website group A.

In other examples, for example, if the user explicitly bookmarks a website under the same folder as other links that are part of an existing website group, then the modification unit 404 may identify that the website is useful to the user and add it to the website group. The modification unit 404 may also identify a wrong website group and delete the entire website group if, for example, the user never clicks or opens the website group.

In addition to modifying the existing website groups, a new website group may be created by the modification unit 404 as well. In one example, new website groups may be identified based on information such as, new websites being introduced in the same time period of an existing website group, new websites being explicitly added to an existing website group, or websites being bookmarked. For example, if a user frequently visits facebook.com and pinterest.com one after another, then it may be used as seed information for creating a new website group. In another example, explicitly bookmarking websites under the same folder as other links that are part of an existing website group may be considered to be a category of website group creation event even though it is not associated with any temporal routine. The refinement module 112 may try to deduce possible website groups for such links. It is understood that, however, any other modification may be included in the refinement policy and made by the modification unit 404 based on the interaction information collected by the interaction information monitor 402 as well.

Figure 5:
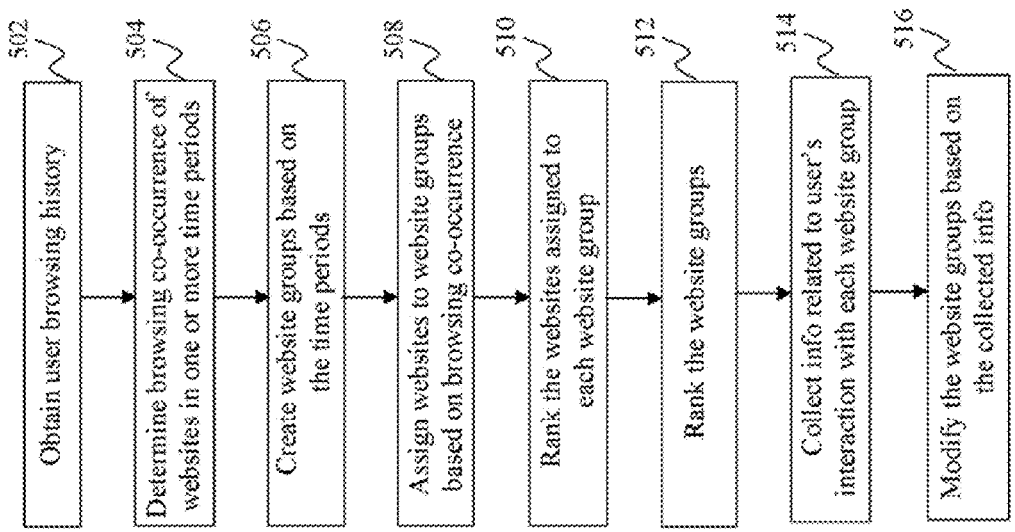
FIG. 5 is a flowchart of another exemplary process for recommending websites, according to an embodiment of the present teaching.

FIG. 5 is a flowchart of an exemplary process in which websites recommendation is performed, according to an embodiment of the present teaching. It will be described with reference to the above figures. However, any suitable module or unit may be employed. Beginning at block 502, information related to a user's browsing history of a plurality of websites is obtained. The information includes, for example, a frequency and a recency of visiting each of the plurality of websites. As described above, this may be performed by the browsing history fetcher 302 of the initiation module 110. At block 504, processing may continue where a browsing co-occurrence of at least some of the plurality of websites in one or more time periods is determined based on the obtained information related to the user's browsing history. The one or more time periods correspond to, for example, morning, noon, night, weekday, or weekend. As described above, this may be performed by the browsing co-occurrence calculator 304 of the initiation module 110. Moving to block 506, website groups are created based on the time periods. As described above, this may be performed by the group creating unit 308 of the initiation module 110. At block 508, the plurality of websites are assigned to a plurality of website groups based on the determined browsing co-occurrence. Each of the plurality of website groups is associated with one of the one or more time periods. In other words, co-occurring websites may be grouped by, for example, any suitable clustering algorithm runs on the browsing history. As described above, this may be performed by the grouping unit 306 of the initiation module 110. At block 510, the websites assigned to each website group is ranked, for example, based on their frecency of visiting and/or user bookmarking. Moving to block 512, the website groups may be also ranked. As described above, blocks 510, 512 may be performed by the ranking unit 310 of the initiation module 110.

At block 514, information related to the user's interaction with each of the plurality of website groups is collected. The collected information includes, but is not limited to, implicit changes of the user's browsing behavior, explicit user interactions with the recommended website groups, user actions other than browsing behavior, e.g., creation of folder, bookmarks, etc., and inactivity with respect to the recommended website groups. As described above, this may be performed by the interaction information monitor 402 of the refinement module 112. Moving to block 516, the plurality of website groups are modified based on the collected information related to the user's interaction. As described above, this may be performed by the modification unit 404 of the refinement module 112.

Figure 6:
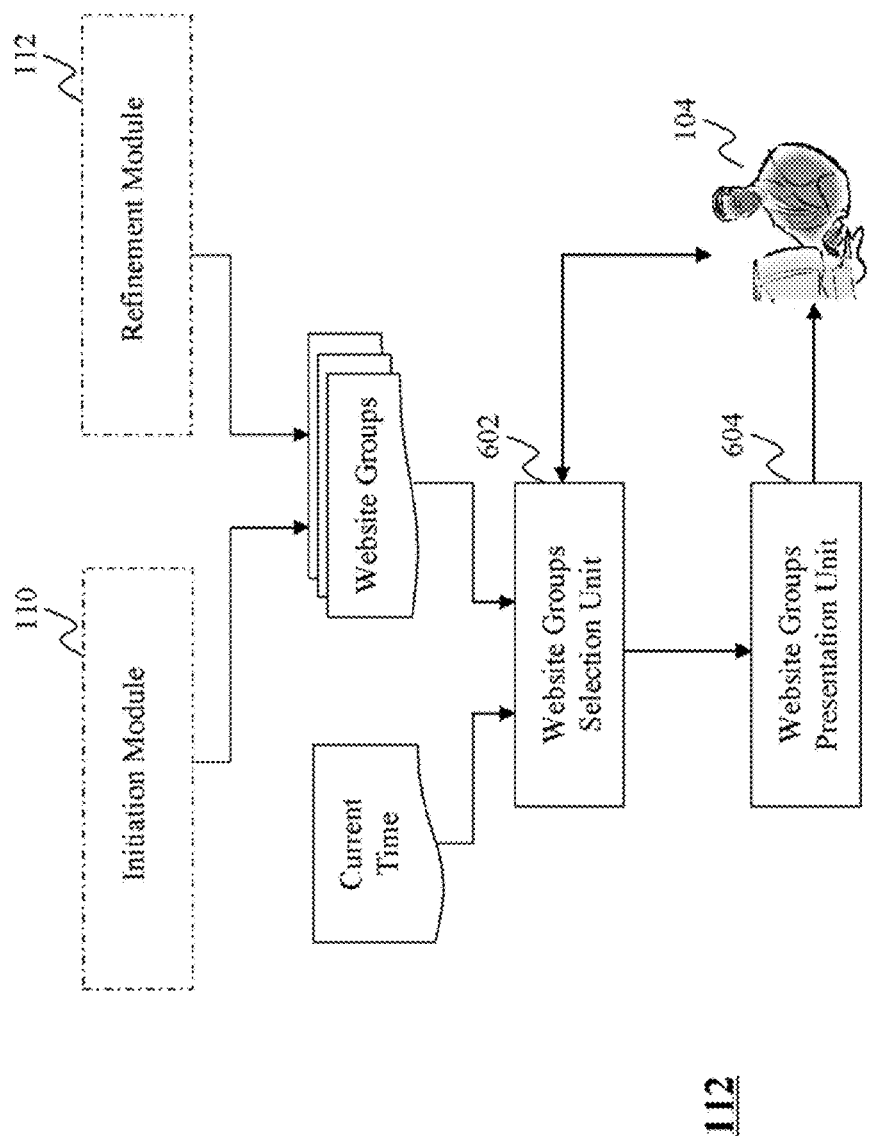
FIG. 6 is an exemplary diagram of a recommendation module of the system for recommending websites shown in FIG. 1, according to an embodiment of the present, teaching.

FIG. 6 is an exemplary diagram of a recommendation module of the system for recommending websites shown in FIG. 1, according to an embodiment of the present teaching. The recommendation module 114 may recommend the website groups to the user 104 based on the time periods associated with the website groups and the current time. The website groups may be, for example, the initial website groups created by the initiation module 110, or the website groups refined by the refinement module 112 based on the continuously collected user interaction data. The recommendation module 114 in this example includes a website groups selection unit 602 and a website groups presentation unit 604.

Figure 8:
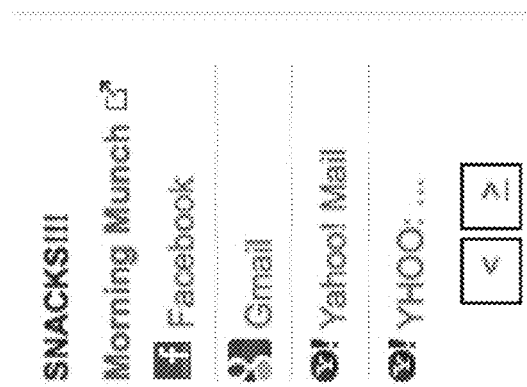
FIG. 8 illustrates an example of a website group recommended to a user.
Figure 9:
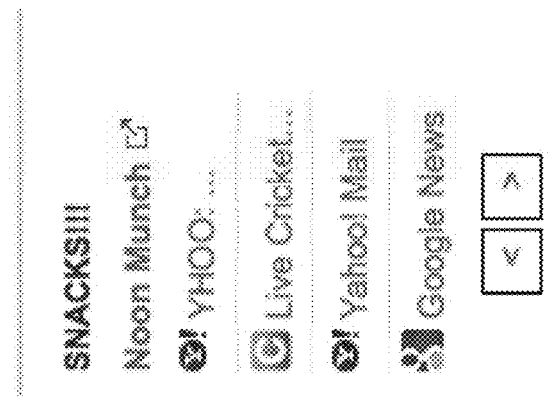
FIG. 9 illustrates another example of a website group recommended to a user.
Figure 10:
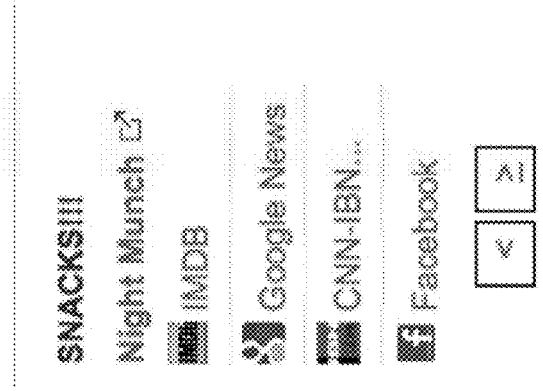
FIG. 10 illustrates still another example of a website group recommended to a user.
Figure 11:
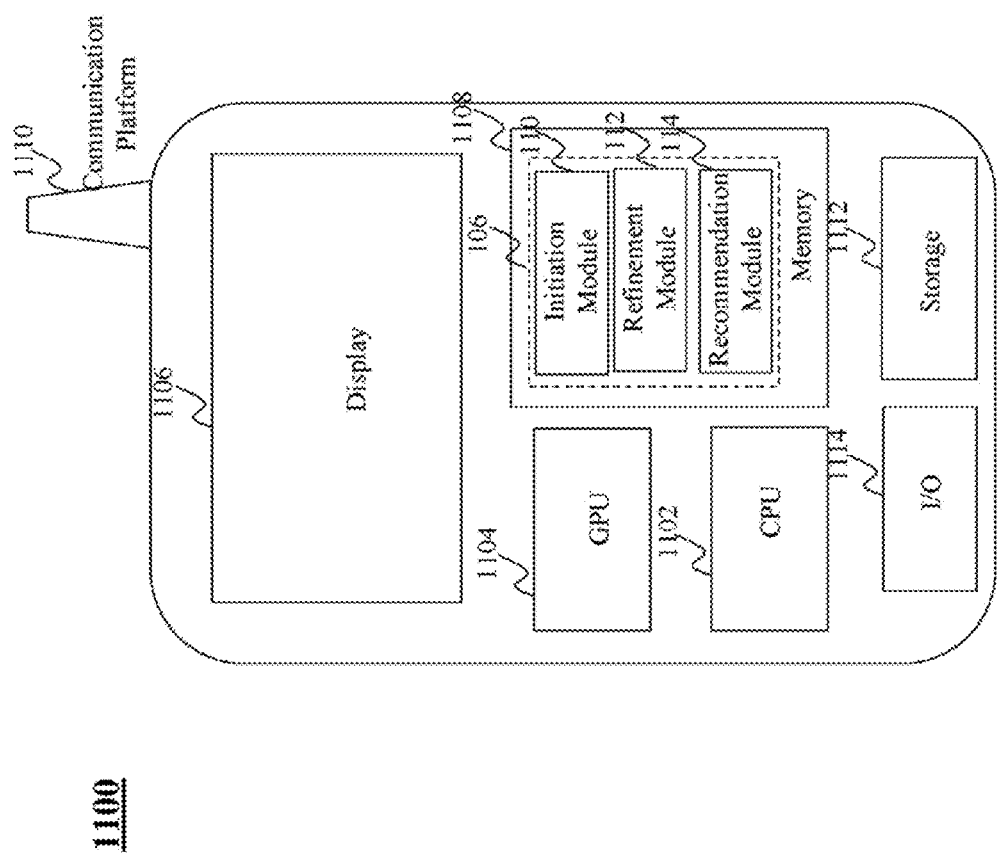
FIG. 11 depicts an exemplary functional block diagram of a user device on which the system for recommending websites resides, according to an embodiment of the present teaching.

The website groups selection unit 602 in this example is configured to determine one or more website groups from all the available website groups. In one example, the website groups selection unit 602 determines one of the plurality of website groups at a time within the time period associated with the determined website group. For example, at 7:30 AM when the user 104 opens the browsing application 106 on which the recommendation module 114 resides, the website groups selection unit 602 may identify one website group that is associated with a "morning" time period. In this example, the website groups presentation unit 604 is configured to present the plurality of websites assigned to the determined website group to the user 104. Referring now to FIG. 8, in one example, a website group associated with the "morning" time period may be presented to the user 104 in the morning. The "morning" website group includes co-occurring websites: facebook.com, gmail.com, mail.yahoo.com, and finance.yahoo.com. As mentioned above, the name of the website group may be optional and may be automatically generated based on the associated time period and changed or deleted by the user 104. Similarly, in FIG. 9, a website group associated with the "noon" time period may be presented to the user 104 at noon. The "noon" website group includes finance.yahoo.com, live cricket, mail.yahoo.com, and news.google.com. As shown in FIG. 10, the "night" website group including imdb.com, news.google.com, cnn.com, and facebook.com may be presented to the user 104 at night.

The website groups selection unit 602 may determine two or more website groups at a time within the time period associated with the determined website group. In one example, more than one website group, each having different website groups, may be created for the same time period. In another example, the time periods associated with different website groups may be overlapped. For example, a website group associated with the "morning" time period and another website group associated with the "weekend" time period may be both determined on Sunday morning. In still another example, the website groups selection unit 602 may choose website groups associated with a time period that is close enough to the current time. For example, at 11:30 AM, the website groups selection unit 602 may choose website groups associated with both the "morning" and "noon" time periods. In any event, if more than one website group are determined by the website groups selection unit 602, the website groups presentation unit 604 is configured to present all the determined website groups to the user 104 to select. Based on the user's selection, the website groups presentation unit 604 may present the websites assigned to the selected website group to the user 104.

Figure 7:
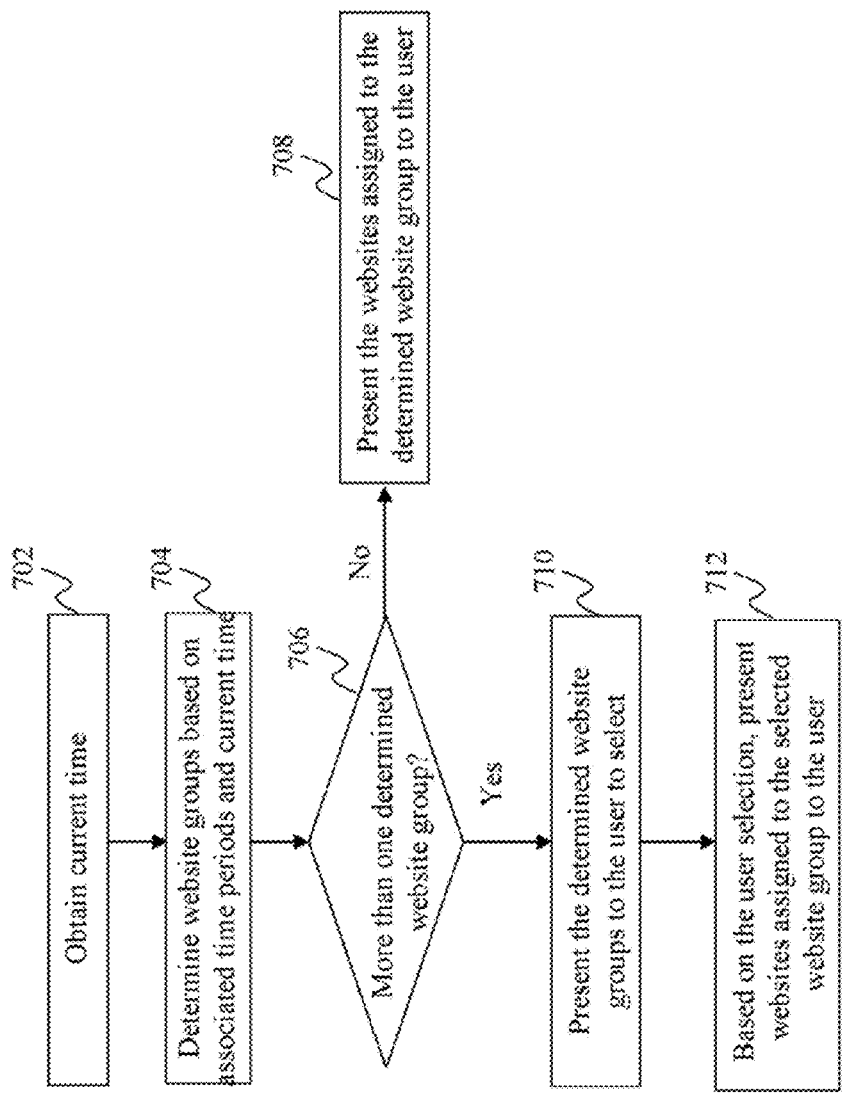
FIG. 7 is a flowchart of still another exemplary process for recommending websites, according to an embodiment of the present teaching.

FIG. 7 is a flowchart of an exemplary process in which websites recommendation is performed, according to an embodiment of the present teaching. It will be described with reference to the above figures. However, any suitable module or unit may be employed. Beginning at block 702, the current time is obtained by the website groups selection unit 602 when the user opens the browsing application 106 on the user device 102. At block 704, website groups are determined by checking their associated time periods against the current time. The number of website groups that are identified by the website groups selection unit 602 at block 704 is checked at block 706. If there is only one website group determined at block 704, process continuous to block 708, where all the websites assigned to the determined website group are opened up and presented to the user by the website groups presentation unit 604. If there are more than one website group determined at block 704, at block 710, all the determined website groups are presented by the website groups presentation unit 604 to the user to select. Based on the user selection, at block 712, all the websites assigned to the selected website group are opened up and presented to the user by the website groups presentation unit 604.

FIG. 10 depicts an exemplary functional block diagram of a user device on which the system for websites recommendation resides, according to an embodiment of the present teaching. In this example, the user device is a mobile device 1100, including but is not limited to, a smart phone, tablet, music player, handled gaming console, GPS. The mobile device 1100 in this example includes one or more central processing units (CPUs) 1102, one or more graphic processing units (GPUs) 1104, a display 1106, a memory 1108, a communication platform 1110, such as a wireless communication module, a storage 1112, and one or more input/output (I/O) devices 1114. Any other suitable component, such as but not limited to a system bus or a controller (not shown), may also be included in the mobile device 1100. As shown in FIG. 10, the browsing application 106 including the initiation module 110, refinement module 112, and recommendation module 114 may be loaded into the memory 1108 from the storage 1112 in order to be executed by the CPU 1102. The initiation module 110, refinement module 112, and recommendation module 114 may be, for example, part of the browsing application 106 or may be a plug-in or add-on that is integrated in the browsing application 106 on various mobile operating systems, e.g., iOS, Android, Windows Phone, etc. Execution of the browsing application 106 with the integrated initiation module 110, refinement module 112, and recommendation module 114 may cause the mobile device 1100 to perform the processing as described above, e.g., in FIGS. 2, 5, and 7. For example, the recommended website groups may be presented to the user by the GPU 1104 in conjunction with the display 1106. The user input may be received through the I/O devices 1114. The browsing application 106 may communicate with remote search engines through the communication platform 1110.

To implement the present teaching, computer hardware platforms may be used as the hardware platform(s) for one or more of the elements described herein. The hardware elements; operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 12:
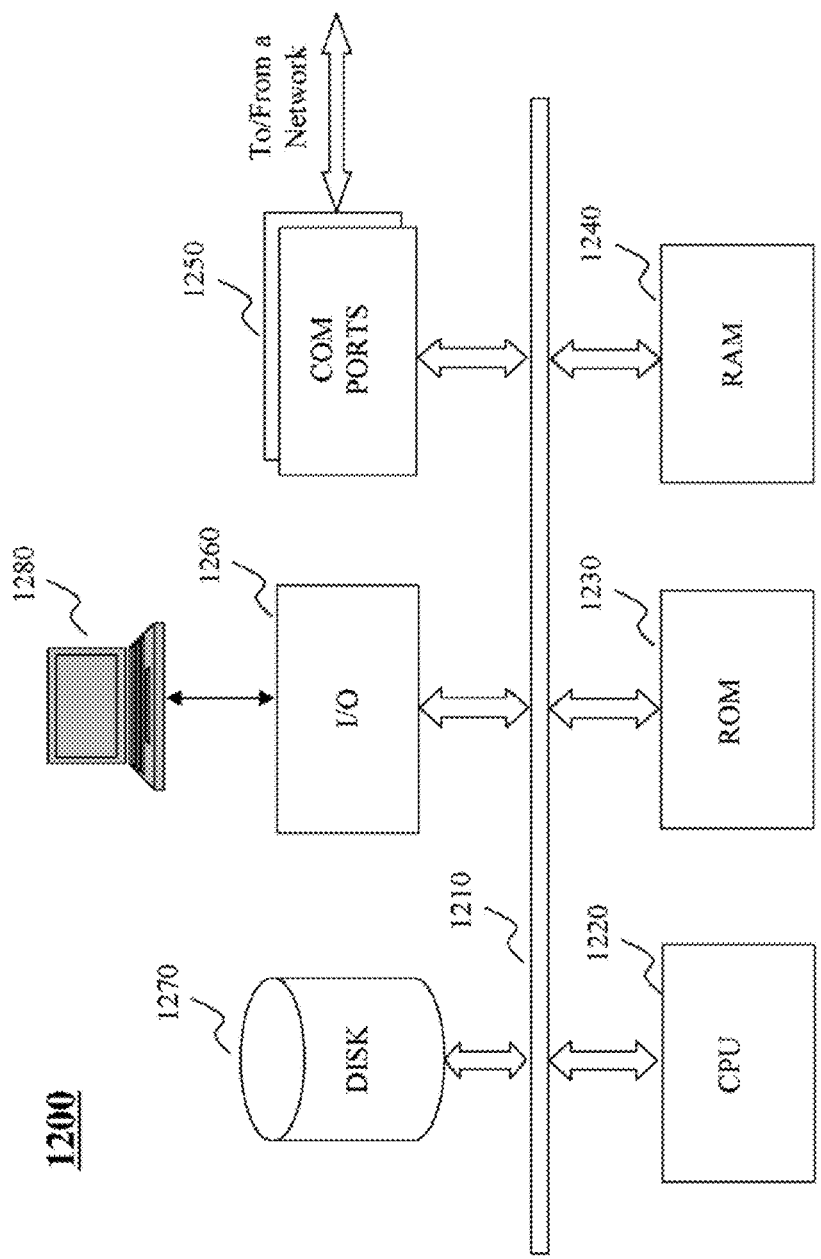
FIG. 12 depicts a general computer architecture on which the present teaching can be implemented.

FIG. 12 depicts a general computer architecture on which the present teaching can be implemented and has a functional block diagram illustration of a computer hardware platform that includes user interface elements. The computer may be a general-purpose computer or a special purpose computer. This computer 1200 can be used to implement any components of the websites recommendation architecture as described herein. Different components of the system, e.g., as depicted in FIG. 1, can all be implemented on one or more computers such as computer 1200, via its hardware, software program, firmware, or a combination thereof. Although only one such computer is shown, for convenience, the computer functions relating to websites recommendation may be implemented in a distributed fashion on a number of similar platforms, to distribute the processing load.

The computer 1200, for example, includes COM ports 1202 connected to and from a network connected thereto to facilitate data communications. The computer 1200 also includes a central processing unit (CPU) 1204, in the form of one or more processors, for executing program instructions. The exemplary computer platform includes an internal communication bus 1206, program storage and data storage of different forms, e.g., disk 1208, read only memory (ROM) 1210, or random access memory (RAM) 1212, for various data files to be processed and/or communicated by the computer, as well as possibly program instructions to be executed by the CPU. The computer 1200 also includes an I/O component 1214, supporting input/output flows between the computer and other components therein such as user interface elements 1216. The computer 1200 may also receive programming and data via network communications.

Hence, aspects of the method of websites recommendation, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, implemented on at least one machine each of which has at least one processor, storage, and a communication platform connected to a network for recommending websites, the method comprising the steps of:
    obtaining information related to a user's browsing history of a plurality of websites;
    determining a browsing co-occurrence of at least some of the plurality of websites in one or more time periods based on the obtained information related to the user's browsing history;
    assigning the plurality of websites to a plurality of website groups based on the determined browsing co-occurrence, wherein each of the plurality of website groups is associated with one of the one or more time periods and is assigned with a set of websites;
    selecting, based on a certain time instance related to a user activity, at least two of the plurality of website groups, wherein the certain time instance falls within at least one of the time periods associated with the at least two website groups;
presenting the selected at least two website groups to the user to select;
based on the user's selection, presenting the set of websites assigned to the user-selected website group to the user;
    collecting information related to the user's interaction with each of the plurality of website groups, wherein the information related to the user's interaction includes a change of the user's browsing behavior in the one or more time periods; and
    modifying the plurality of website groups based on the collected information related to the user's interaction.

2. The method of claim 1, wherein the information related to the user's browsing history includes a frequency and a recency of visiting each of the plurality of websites.

3. The method of claim 2, wherein the step of assigning comprises the steps of:
    determining a weight for each of the set of websites assigned to each of the plurality of website groups based on the corresponding frequency and recency; and
    for each of the plurality of website groups, ranking the set of websites based on their weights.

4. The method of claim 1, wherein the step of assigning comprises the steps of:
    creating the plurality of website groups based on the one or more time periods; and
    ranking the plurality of website groups based on the set of websites assigned to each of the plurality of website groups.

5. The method of claim 1, wherein the information related to the user's interaction further includes at least one of:
    an explicit interaction with the plurality of website groups;
    a user action other than browsing behavior; and
    an inactivity with respect to the plurality of website groups.

6. The method of claim 1, wherein modifying the plurality of website groups includes modifying at least one of the set of websites assigned to a website group.

7. The method of claim 1, wherein the one or more time periods correspond to at least one of morning, noon, night, weekday, and weekend.

8. The method of claim 1, wherein said presenting the set of websites comprises simultaneously presenting the set of websites to the user.

9. The method of claim 8, wherein said simultaneously presenting the set of websites comprises at least one of:
    automatically opening up each of the set of websites, and simultaneously presenting icons representing each of the set of websites.

10. A system having at least one processor, storage, and a communication platform connected to a network for recommending websites, comprising:
    a browsing history fetcher implemented on the at least one processor and configured to obtain information related to a user's browsing history of a plurality of websites;
    a browsing co-occurrence calculator implemented on the at least one processor and configured to determine a browsing co-occurrence of at least some of the plurality of websites in one or more time periods based on the obtained information related to the user's browsing history;
    a grouping unit implemented on the at least one processor and configured to assign the plurality of websites to a plurality of website groups based on the determined browsing co-occurrence, wherein each of the plurality of website groups is associated with one of the one or more time periods and is assigned with a set of websites;
    a recommendation module implemented on the at least one processor and configured to:
        select, based on a certain time instance related to a user activity, at least two of the plurality of website groups, wherein the certain time instance falls within at least one of the time periods associated with the at least two website groups;
        present the selected at least two website groups to the user to select; and
        based on the user's selection, present the set of websites assigned to the user-selected website group to the user; and
    a refinement module configured to:
        collect information related to the user's interaction with each of the plurality of website groups, wherein the information related to the user's interaction includes a change of the user's browsing behavior in the one or more time periods; and
        modify the plurality of website groups based on the collected information related to the user's interaction.

11. The system of claim 10, wherein the information related to the user's browsing history includes a frequency and a recency of visiting each of the plurality of websites.

12. The system of claim 11, wherein the grouping unit is further configured to:
    determine a weight for each of the set of websites assigned to each of the plurality of website groups based on the corresponding frequency and recency; and
    for each of the plurality of website groups, rank the set of websites based on their weights.

13. The system of claim 10, wherein the grouping unit is further configured to:
    create the plurality of website groups based on the one or more time periods; and
    rank the plurality of website groups based on the set of websites assigned to each of the plurality of website groups.

14. The system of claim 10, wherein the information related to the user's interaction further includes at least one of:
    an explicit interaction with the plurality of website groups;
    a user action other than browsing behavior; and
    an inactivity with respect to the plurality of website groups.

15. The system of claim 10, wherein the refinement module is further configured to modify at least one of the set of websites assigned to a website group.

16. The system of claim 10, wherein the one or more time periods correspond to at least one of morning, noon, night, weekday, and weekend.

17. A machine-readable tangible and non-transitory medium having information for recommending websites recorded thereon, wherein the information, when read by the machine, causes the machine to perform the following:
- obtaining information related to a user's browsing history of a plurality of websites;
- determining a browsing co-occurrence of at least some of the plurality of websites in one or more time periods based on the obtained information related to the user's browsing history;
- assigning the plurality of websites to a plurality of website groups based on the determined browsing co-occurrence, wherein each of the plurality of website groups is associated with one of the one or more time periods and is assigned with a set of websites;
- selecting, based on a certain time instance related to a user activity, at least two of the plurality of website groups, wherein the certain time instance falls within at least one of the time periods associated with the at least two website groups;
- presenting the selected at least two website groups to the user to select;
- based on the user's selection, presenting the set of websites assigned to the user-selected website group to the user;
- collecting information related to the user's interaction with each of the plurality of website groups, wherein the information related to the user's interaction includes a change of the user's browsing behavior in the one or more time periods; and
- modifying the plurality of website groups based on the collected information related to the user's interaction.

18. The medium of claim 17, wherein said presenting the set of websites comprises simultaneously presenting the set of websites to the user.

19. The medium of claim 18, wherein said simultaneously presenting the set of websites comprises at least one of:
- automatically opening up each of the set of websites, and simultaneously presenting icons representing each of the set of websites.

* * * * *